United States Patent [19]

Landwehr et al.

[11] Patent Number: 4,873,049
[45] Date of Patent: Oct. 10, 1989

[54] MOLDING OUTER AND INNER SOLES ONTO SHOE UPPERS

[75] Inventors: Reinhard Landwehr, Achim; Günter Rebers, Achim-Baden, both of Fed. Rep. of Germany

[73] Assignee: Klöckner Ferromatik Desma GmbH, Malterdingen, Fed. Rep. of Germany

[21] Appl. No.: 217,965

[22] Filed: Jul. 12, 1988

Related U.S. Application Data

[62] Division of Ser. No. 116,361, Nov. 4, 1987, Pat. No. 4,801,256.

[30] Foreign Application Priority Data

Nov. 5, 1986 [DE] Fed. Rep. of Germany ....... 3637697
Dec. 20, 1986 [DE] Fed. Rep. of Germany ....... 3643821

[51] Int. Cl.⁴ .............................................. B29C 39/04
[52] U.S. Cl. ..................... 264/513; 264/511; 264/255; 264/297.3; 264/297.6
[58] Field of Search ............ 264/244, 250, 255, 297.3, 264/297.6, 511, 513; 425/110, 119, 126.1, 127, 129.1, 129.2, 134

[56] References Cited

U.S. PATENT DOCUMENTS 3,915,608 10/1975 Husik .................................... 425/130
4,302,416 11/1981 Rudolf et al. ........................ 425/119
4,722,677 2/1988 Rebers .................................. 425/119

FOREIGN PATENT DOCUMENTS 0678671 1/1964 Canada .................................. 150/18

Primary Examiner—Jan H. Silbaugh
Assistant Examiner—Nicholas Krisch
Attorney, Agent, or Firm—Watson, Cole, Grindle & Watson

[57] ABSTRACT

A process for molding an outer sole of elastomer and an inner sole of a mixture of isocyanate and a polyol reacting into polyurethane to shoe uppers includes a vertically movable upper cross block supporting a pivotably mounted mold carrier with a heatable first mold part at one end for the molding of outer soles, and a lower, vertically adjustable cross block has a mold plate confronting the first mold part. The first mold part releases the molded outer sole on to the mold plate, the mold carrier is pivoted such that a cooled second mold part at the opposite end thereof overlies the molded outer sole which is then transferred to the second mold part, the mold carrier is again pivoted to confront the molded outer sole to a shoe last supported shoe upper, and an inner sole mold cavity is formed with the molded outer sole juxtaposed to the last supported shoe upper, and by an opposed pair of lateral mold elements closed about the shoe upper.

3 Claims, 6 Drawing Sheets

MOLDING OUTER AND INNER SOLES ONTO SHOE UPPERS

RELATED APPLICATIONS

This application is a divisional application of application Ser. No. 116,361, filed Nov. 4, 1987, now U.S. Pat. No. 4,801,256.

This application relates to U.S. Ser. No. 116,666 filed on even date herewith, now U.S. Pat. No. 4,810,178, corresponding to German application Nos. P 36 438 22.7-26 and P 36 37 696.5-26, respectively filed Dec. 21, 1986 and Nov. 5, 1986, relates to commonly assigned U.S. Ser. No. 135,369 filed Dec. 21, 1987, corresponding to German application No. P 36 438 20.0-26, filed Dec. 20, 1986, and further relates to commonly assigned U.S. Ser. No. 942,832, filed Dec. 17, 1986 now abandoned.

BACKGROUND OF THE INVENTION

This invention relates to the molding of outer and inner soles onto shoe uppers, the outer sole consisting of an elastomer material and the inner sole consisting of a thermoplastic material, the inner and outer soles being joined together by a chemical bond between isocyanate contained in the thermoplastic material and reactive end group substances added to the elastomer. The apparatus has a vertically moveable upper cross block with a mold carrier mounted thereon for pivotal movement about a transverse axis, the mold carrier having a heatable first mold part at one end for the molding of outer soles in a molding position of the apparatus. A vertically moveable lower cross block has a mold plate in engagement with the first mold part in the molding position. The pivotable mold carrier together with lateral mold elements of the apparatus and a shoe last-mounted shoe upper cooperate together to define a cavity for the molding of the inner sole.

The molding apparatus may be located at each of a plurality of molding stations on a circular turntable for carrying out the molding operation.

German patent No. 22 41 493 discloses shoes with an inner sole of polyurethane and an outer sole also of polyurethane.

Circular turntable installations providing a plurality of molding stations are generally disclosed in Publication No. DESMA 521S-526S, Klockner-Ferromatik Desma GmbH, and entitled "Injection Molding Machine For Direct Attachment Of Soles." The circular turntable installations have two devices for the mixing of isocyanate and a polyol into a mixture reacting into polyurethane which, depending on the mixing ratio and the additives, reacts into a wear-resistant outer sole or a flexible inner sole.

The circular turntable is rotated incrementally for molding the outer soles and the inner soles. The molding stations are stopped during incremental movement and interlocked when stopped relative to the two mixing and injection devices.

These devices are located along the periphery of the turntable and are movable in a radial direction toward the turntable. The molding apparatus at each station has two lateral molding elements which, in a mold closed position, define an opening and two sprue channels.

A vertically moveable last turning body is mounted on the apparatus above the lateral mold elements, the body having a counterstamp and a shoe last for supporting the shoe uppers.

A vertically adjustable bottom stamp is located below the lateral mold elements. The bottom stamp, lateral mold elements in their mold closing position and the counterstamp together define a mold cavity into which the mixture reacting into the outer sole is introduced.

The bottom stamp which contains the molded outer sole, the lateral mold elements in a mold closed position, and the shoe last which supports the shoe upper together define a mold cavity for molding the inner sole as the mixture reacting into the inner sole is introduced into the mold cavity which, in the course of the reaction, bonds to the outer sole and to the shoe upper.

U.S. Ser. No. 942,832, among the aforementioned related applications, discloses molding stations on a circular turntable for the molding of shoe soles with an outer sole of elastomer and an inner sole of polyurethane.

For the molding of the outer sole of elastomer, there is provided, in lieu of a previously employed device for mixing the mixture reacting into polyurethane, a plastification and injection aggregate device for plastification of the elastomer, as employed in injection molding machines for the processing of thermoplastic synthetic materials, and for injection of the elastomer into the outer sole mold cavity. Since high pressures occur during the injection of the plastified elastomer, the molding apparatus at each station is provided with an upper, vertically adjustable cross block supporting a pivotably mounted mold carrier with pairs of opposing heatable mold parts lying parallel to the pivot axis, each mold part defining a mold cavity for the outer sole and including cooling channels.

A lower, vertically adjustable cross block below the first cross block has a heatable plate facing the mold carrier and cooperates with the heatable mold parts thereof for the production of outer soles. Above the upper vertically moveable cross block is a fixed cross block having an opening into which a heatable mold part with a molded outer sole in its mold cavity projects and combines together with laterally movable mold elements, located above the fixed cross block, for the molding of an inner sole of polyurethane.

The mixtures which react into polyurethane for the outer sole and/or for the inner sole essentially consist of a polyol and isocyanate, as well as chain extenders and catalysts, which are adjusted by the respective additives for the desired material properties of the outer soles and/or inner soles, whereby the outer sole is rendered wear resistant and the inner sole flexible having a porous structure.

The chemical reaction starts with the mixing of the components. In the mold, the mixtures react into outer soles or inner soles. During the reaction into the inner sole, the molding of the sole takes place simultaneously with the bonding to the shoe upper and to the outer sole.

The outer sole of elastomer and the inner sole of polyurethane are bonded in the area of their contacting surfaces by chemical bonds between isocyanate and reactive end groups of the substances added to the elastomer.

As likewise employed for the present invention, the mixtures reacting into polyurethane are mixtures on the basis of ether or esterpolyols, containing on the basis of 100 parts by weight:

30–100 parts by weight isocyanate;
0.1–10 parts by weight catalyst;
the remainder chain expanders; and other usual additives.

The catalyst which may be used is DABCO-SB produced by Airproducts Company.

The outer soles are made from elastomers which can be mixed with the following chemical compounds or chemical substances in quantitative shares of 0–20 phr, relative to the rubber amount: e.g., acryl-nitryl-rubber, styrol-butadiene-rubber, natural rubber, chloroprene-rubber.

The outer soles can generally be produced from any known rubber quantities if, for example, the following substances are mixed in quantities of 0–20 phr (quantity relative to the amount of rubber used):
phenolformaldehyde resins, e.g.
    Vulkadur A (Bayer AG)
    Coretack (BASF)
methylolized phenolformaledhyde resins, e.g.:
    SP 1045 (Krahn)
    Korever (BASF)
resorcin in connection with a formaldehyde dispenser, e.g.:
    Cohedur A (Bayer AG)
    Cohedur RS (Bayer AG)
    Cohedur RK (Bayer AG)
silicic acid fillers, e.g.:
    Vulkasil S (Bayer
    Ultrasil (Degussa)
aminoalcohol, e.g.:
    3-amino-propanol
primary or secondary amine, e.g.:
    Stearylamine
polyvinylalcohol, e.g.:
    Mowiwol (Hoechst)
    VSH 72 (AIR PRODUCTS)
    VSH 73 (AIR PRODUCTS)
high hydroxylgroup containing polyol, e.g.:
    Formrez (Witco)
Acrylate rubber (ACM) e.g.:
    Hydrin (Polysar)
    Hercolor (Hercules)
or a combination of the above substances.

The formation of the outer sole of the elastomer is carried out in such a manner that the elastomers plastify at the usual processing temperatures and are injected into the mold cavities according to the usual technology and corresponding high pressures of injection molding machines.

The control of the temperature of the elastomers is carried out such that the temperature of the injected outer soles is cooled to just below the decomposition temperature of the polyurethane for the inner sole to be produced and then the mixture reacting into the polyurethane is brought into contact with the outer sole, whereby in the contacting surfaces between the elastomer and the reacting polyurethane isocyanate reacts with the reactive end groups.

Taken into account in the control of the temperature of the elastomer is that a temperature increase or a temperature reduction of 10° C. leads to a shortening or lengthening of the vulcanization time, i.e., the time needed for the elastomer to complete its reaction, by 50%.

One of the problems encountered with the molding apparatus of the aforementioned published application is that the cooling rate of the molded outer sole of elastomer to the temperature at which the mixture reacting at the polyurethane for the inner sole is introduced into the mold cavity for the inner sole is essentially determined by the high heat capacity of the mold parts located on the pivotable mold carrier. This cooling rate has the effect that the time required for the molding and cooling of an outer sole is considerably longer than the time required for molding the inner sole.

SUMMARY OF THE INVENTION

It is therefore an object of the present invention to mold outer and inner soles on to shoe uppers in a manner to ensure sufficient cooling of the molded outer sole during the simultaneous molding of the outer sole of elastomer and an inner sole of polyurethane.

Accordingly, the pivotable mold carrier of the present invention mounted on an upper vertically adjustable cross block has a heatable first mold part at one end in engagement with a heatable mold plate of a lower vertically adjustable cross block defining a mold cavity for the outer sole of elastomer to be molded. The mold carrier having a cooled second mold part at its opposite end works together with closed lateral mold elements and a shoe last-mounted shoe upper which together with an already molded outer sole defines a mold cavity for the inner sole. A shoe last holder is mounted above the lateral mold elements for vertical movement between extended and retracted positions, and may further be mounted for pivotal movement about a transverse axis. The last holder has a shoe last for supporting a shoe upper. The first mold part releases the molded outer sole on to the mold plate, the mold carrier pivots such that the second mold part overlies the released molded outer sole, and removes the outer sole from the plate by suction. The mold carrier pivots and brings the second mold part with the retained molded outer sole into juxtaposition with the last supported shoe upper. The mold carrier is shifted toward the shoe last so that the inner sole mold cavity is formed. Polyurethane injected into the inner sole mold cavity chemically bonds to the elastomer and bonds to the shoe upper.

The molding apparatus of the invention may be mounted on a circular turntable at each of several stations, so that the incremental movements of the turntable may be synchronized with the injection intervals of the elastomer and polyurethane into the outer sole and inner sole mold cavities. The inner and outer soles may therefore be molded simultaneously. And, the times for vulcanizing and cooling the outer soles injection molded from elastomer are separate, so that the outer soles may be vulcanized in the closed and heated mold during a given number of incremental turns of the turntable, and the mold thereafter opened only when moved into a working position shortly before it reaches the device for mixing and injecting the polyurethane.

DETAILED DESCRIPTION OF THE INVENTION

Figure 1:
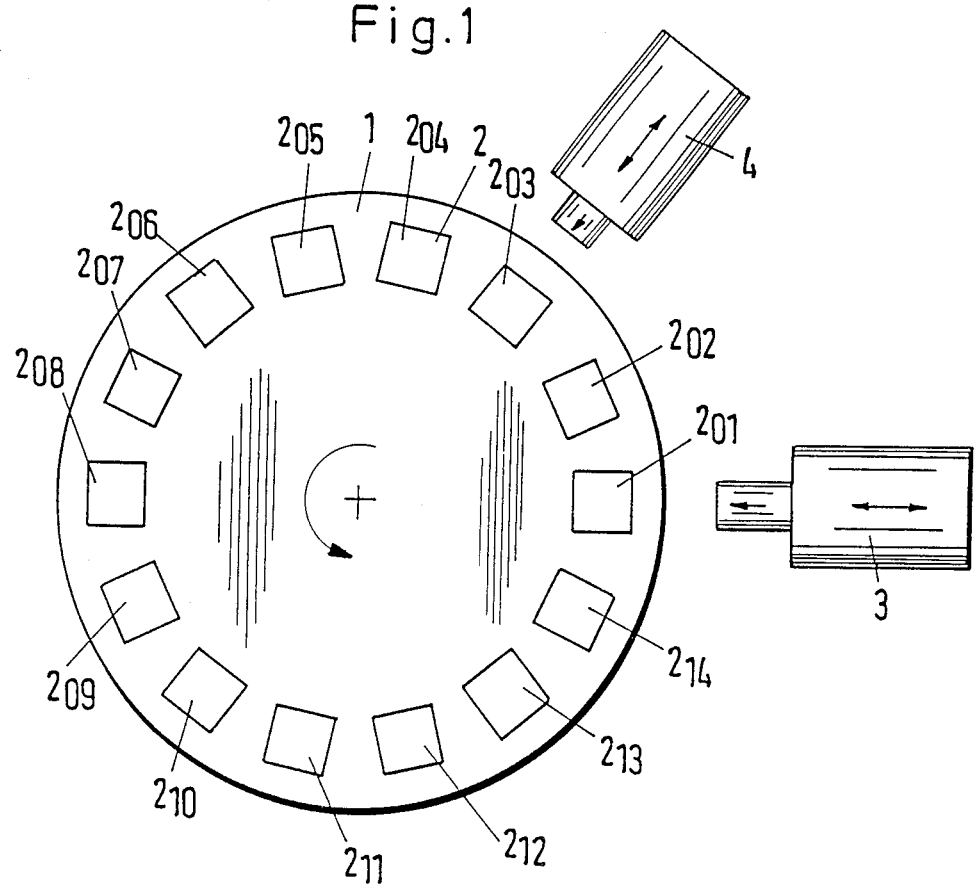
FIG. 1 is a schematic top plan view of a circular turntable showing a plurality of stations at each of which an apparatus according to the invention is located, an injection device for the outer sole material and a mixing/injection device for the inner sole material being shown relative to the turntable.

Circular turntable 1 in FIG. 1 illustrates 14 molding stations 2 arranged equally spaced and schematically illustrated by squares. The squares also illustrate the positions which the molding stations assume during the incremental rotation of the turntable. With the present arrangement, each mold station will reach its original position after 15 incremental turns of the turntable. The positions are designated $2_{01}$ to $2_{14}$.

A radially disposed plastification and injection aggregate device 3 for an elastomer is located adjacent the periphery of the turntable. After each incremental movement of the turntable, i.e. equal to a 1/14 th turn, device 3 is locked in some normal manner relative to one of the molding stations 2 shown in position $2_{01}$, and is capable of shifting radially relative to the turntable. When the device 3 is interlocked with the mold station, elastomer for the outer soles is injected into the mold cavity of the apparatus.

Also arranged in a radially shiftable manner relative to the turntable is a device 4 for the mixing of the mixture reacting into polyurethane. After each incremental turn of the turntable this device can also be interlocked with one of the work stations which had been rotated to the corresponding work, station $2_{03}$, so that material for molding the inner sole is injected into the mold cavity of the apparatus. Depending on the reaction or vulcanization time of the materials used, the two devices can be interchanged from that shown.

Molding apparatus 2 is shown in detail in FIGS. 2 to 6 in various working positions as viewed in the direction of the single arrows on devices 3 and 4.

Figure 2:
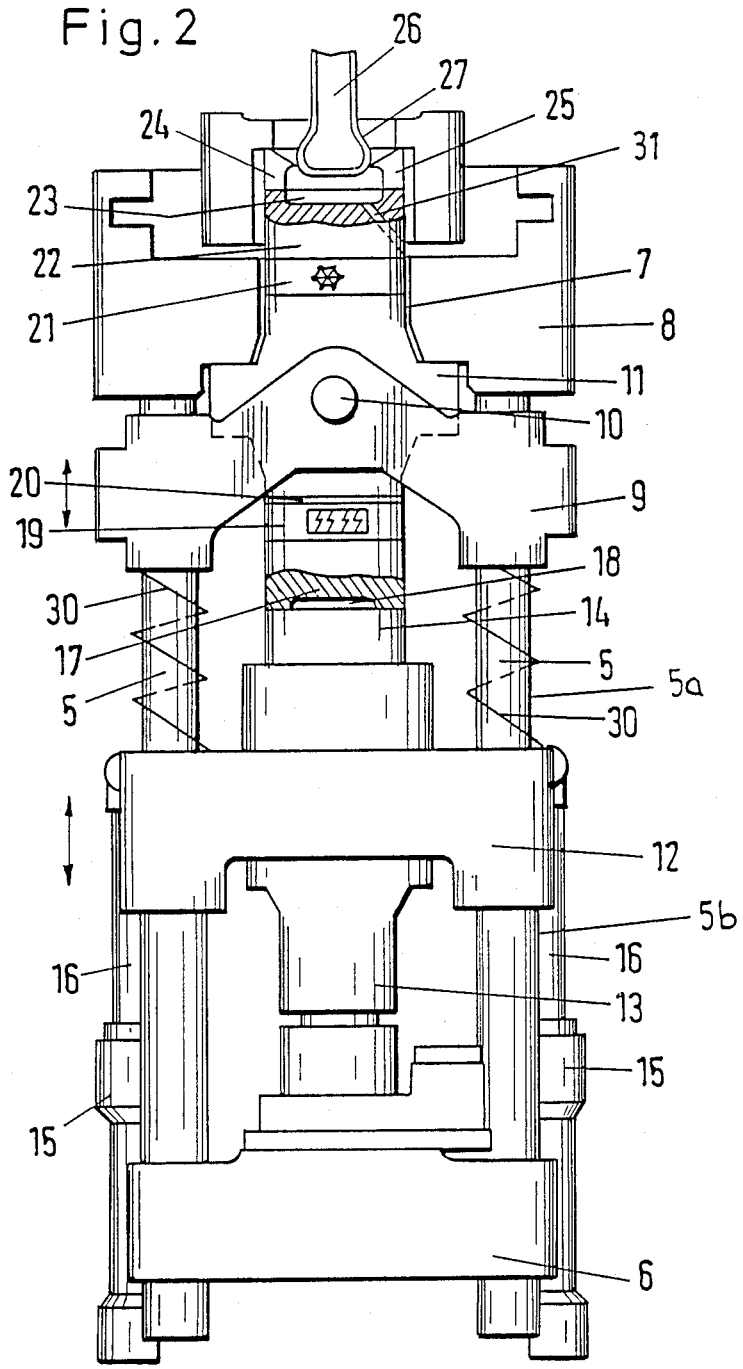
FIGS. 2 to 6 are schematic views in side elevation of the details of the present apparatus illustrating the various operations of the molding apparatus carried out during the molding operation.

The mold parts for molding apparatus 2 of FIG. 2 for the molding of the outer sole and for the molding of the inner sole are shown in closed position.

The apparatus has a generally upstanding frame structure which includes four spaced upstanding guide posts 5, of which only two are visible. A lower fixed cross block 6 and an upper fixed cross block 8, having a central opening 7, form a fixed guide frame together with guide posts 5 fixed at opposite ends to blocks 6 and 8. An upper, vertically movable cross block 9 is mounted for sliding movement along guide post sections 5a of smaller diameter compared to guide post sections 5b. A mold carrier 11 is mounted on block 9 for pivotable movement about the central axis of transverse bolt 10. A lower, vertically moveable cross block 12 is arranged for sliding movement along larger diameter sections 5b of the guide posts.

Hydraulic or pneumatic piston and cylinder units 15, 16 extend between cross blocks 12 and 6 for vertically moving both cross blocks 9 and 12 into the mold closing position of FIG. 2 in which mold carrier 11 is fully extended so as to bear against cross block 8 adjacent its central opening. A mold locking cylinder 13 operating between blocks 6 and 12 locks the cross blocks in the mold closing position. And, a heatable plate 14 mounted on cross block 12 bears against one end of the mold carrier in the FIG. 2 position.

The mold carrier has a heatable first mold part 17 at such one end with a cavity 18 sized to that of the outer sole to be molded. The heat plate 14 bears against this mold part 17 in the mold closed position of FIG. 2, and a back up heat plate 19 is secured to mold part 17 and is attached to the mold carrier via an insulating layer 20.

The mold carrier has a second mold part 22 at its opposite end formed with a mold nest 23, and an insulated cooling plate 21 interconnecting mold part 22 to the mold carrier. The cooling plate may be provided with passages (not shown) through which a cooling medium flows. And, mold nest 23 is sized to the dimension of the molded outer sole.

Mold part 22 has a plurality of suction channels 31 (only one being shown for clarity) connected to a vacuum source (not shown) for suctioning the molded outer sole for supporting it in cavity 23 during pivotal movement of the mold carrier, as will be described in more detail hereinafter.

Figure 3:
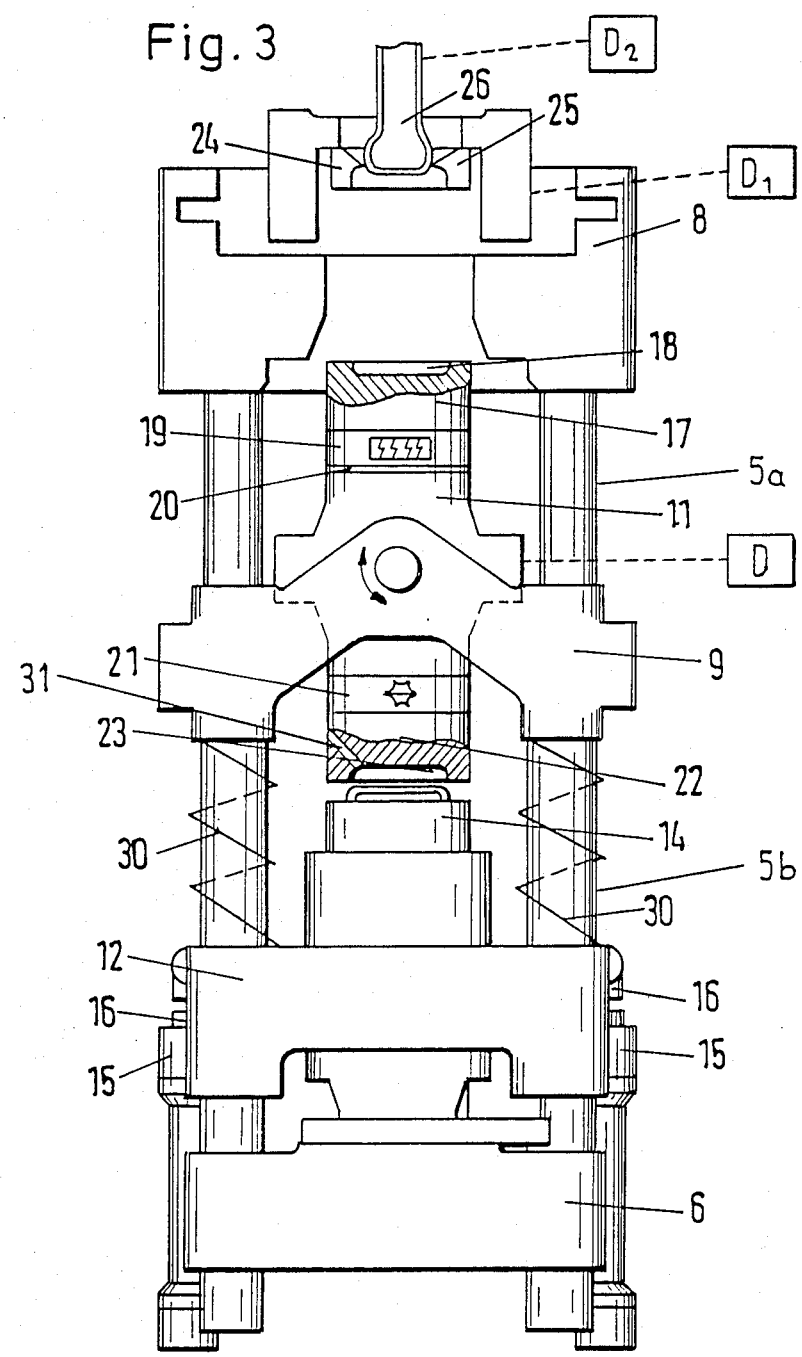
Figure 4:
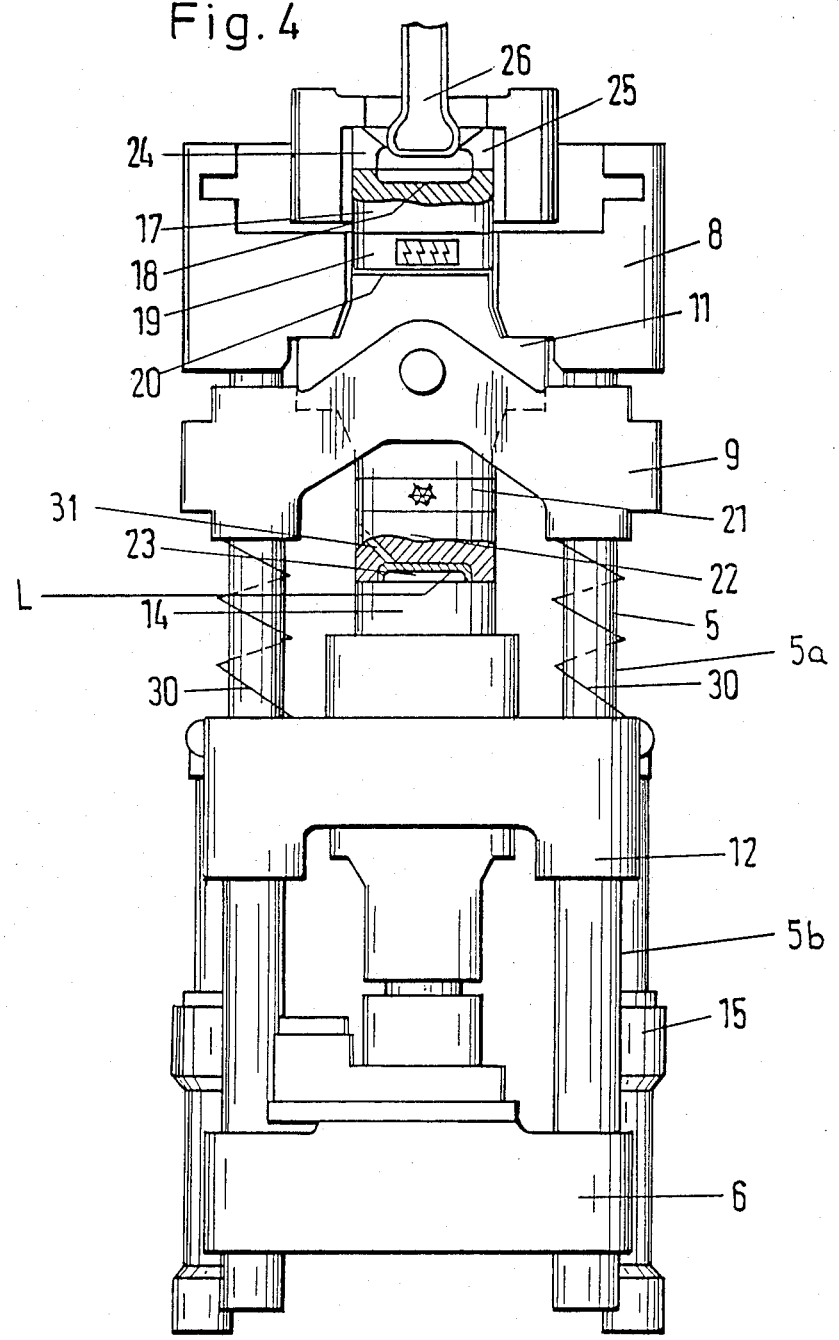

A pair of opposing, laterally movable side mold elements 24, 25 are mounted on the upper surface of cross block 8. Suitable actuation means, such a $D_1$ schematically shown in FIG. 3, is provided for shifting the lateral mold elements between open and closed positions. In the mold closed position of FIG. 2, the closed mold elements 24, 25 together with a shoe upper 27 supported on a shoe last 26, and mold part 22 containing an already formed outer sole (as will hereinafter be more fully described in detail) define a mold cavity for the molding of the inner sole.

As high peak pressures occur during the injection of outer soles of elastomer, comparable to those peak pressures which take place in injection molding machines for the processing of plastic material, the usual drive cylinders and mold locking cylinders are required similar to those employed in such injection molding machines.

During injection of the plastified elastomer into mold cavity 18 in the mold closed position of FIG. 2, wherein the mold cavity is delineated by heatable plate 14 and mold part 17 in the closed position, the reaction force applied to the frame is taken up by cross blocks 6 and 8 as pivotable mold part carrier 11 bears against cross block 8 at the surrounding area of its opening 7. Coiled pressure springs 30, or the like, extend between cross blocks 9 and 12 such that the upward vertical movement of cross block 12 via drive units 15, 16 is transmitted to cross block 9.

A last holder of known construction (not shown), has a last body mounted on the frame structure of the apparatus above cross block 8. Some suitable means such as a hydraulic piston and cylinder unit $D_2$ or the like may be provided to effect vertical adjustment if required. Also, the last holder may be mounted for pivotal movement about a transverse axis. Shoe last 26 extends from one end of the last body and supports a shoe upper 27.

FIG. 2 illustrates the relative positions of the cross blocks of the molding apparatus 2 at station $2_{01}$ (FIG. 1). At station the plastification and injection aggregate device 3 is radially moved toward the turntable and abuts a pour opening (not shown) of mold cavity 18 for injecting plastified elastomer into the mold cavity for molding an outer sole L. The mold cavity remains closed until, after a corresponding number of incremental moves of the turntable, the molding apparatus at station $2_{01}$ has reached station $2_{11}$, after passing through stations $2_2$ through $2_{10}$. At station $2_{11}$ the Pistons of units 15, 16 are retracted causing cross blocks 12 and 9 to lower to their FIG. 3 position. Block 12 slides along guide post sections 5b, and block 9 slides along guide post sections 5a and is stopped as it bears against shoulders (not shown), or the like, at the transition between the different diameter sections 5a, 5b. Pressure springs 30 Permit block 9 to stop in the position shown in FIG.

3 while block 12 moves slightly further away therefrom to provide a clearance between the mold carrier and heat plate 14, as shown. Mold carrier 11 is then pivoted to its FIG. 3 position through 180° by actuation by some suitable drive means D so that cold mold part 22 confronts heat plate 14 and heatable mold part 17 confronts opening 7 of cross block 8.

In the lowered position of blocks 12 and 9 of FIG. 3, the molded outer sole L releases from cavity 18 of the first mold part and rests on mold plate 14, as shown before the mold carrier is pivoted. Thus, mold part 22 overlies the released molded outer sole, whereafter blocks 9, 12 are raised to their FIG. 4 position. Suction channels 31 (only one being shown for clarity) in mold part 22 are connected to some suitable vacuum source (not shown) for suctioning molded outer sole L to cavity 23 of part 22.

Figure 5:
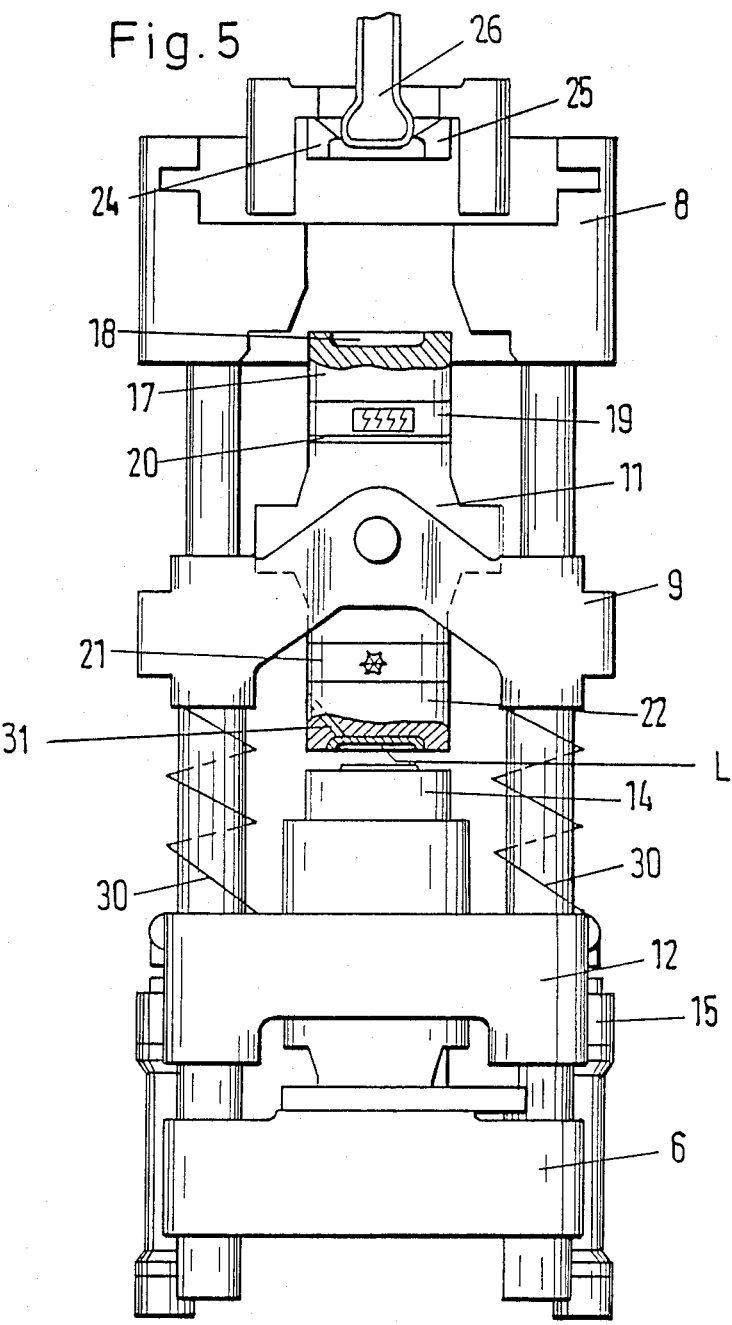

Blocks 9, 12 are then lowered to their FIG. 5 position while the blocks 9, 12 are again raised. Last 26 is then lowered and mold elements 24, 25 are closed, as shown in FIG. 2. The molded outer sole retained in cavity 23 of mold part 22, together with the closed lateral mold elements 24, 25 and the last supported shoe upper define a mold cavity for the inner sole into which the reaction mixture is injected uPon operation of device 4 with the apparatus moved to station $2_{03}$.

In the FIG. 2 mold closed position, the molding apparatus is at station $2_{01}$ such that the elastomer is injected into cavity 18 for molding another outer sole simultaneously with the injection molding of the inner sole.

Blocks 9, 12 are then lowered to the FIG. 3 position at which the molding apparatus has been moved to stations $2_{12}$, $2_{13}$ and $2_{14}$ for removing the finished shoe and mounting another shoe on the shoe last for repeating the operation according to the aforedescribed process steps.

Figure 6:
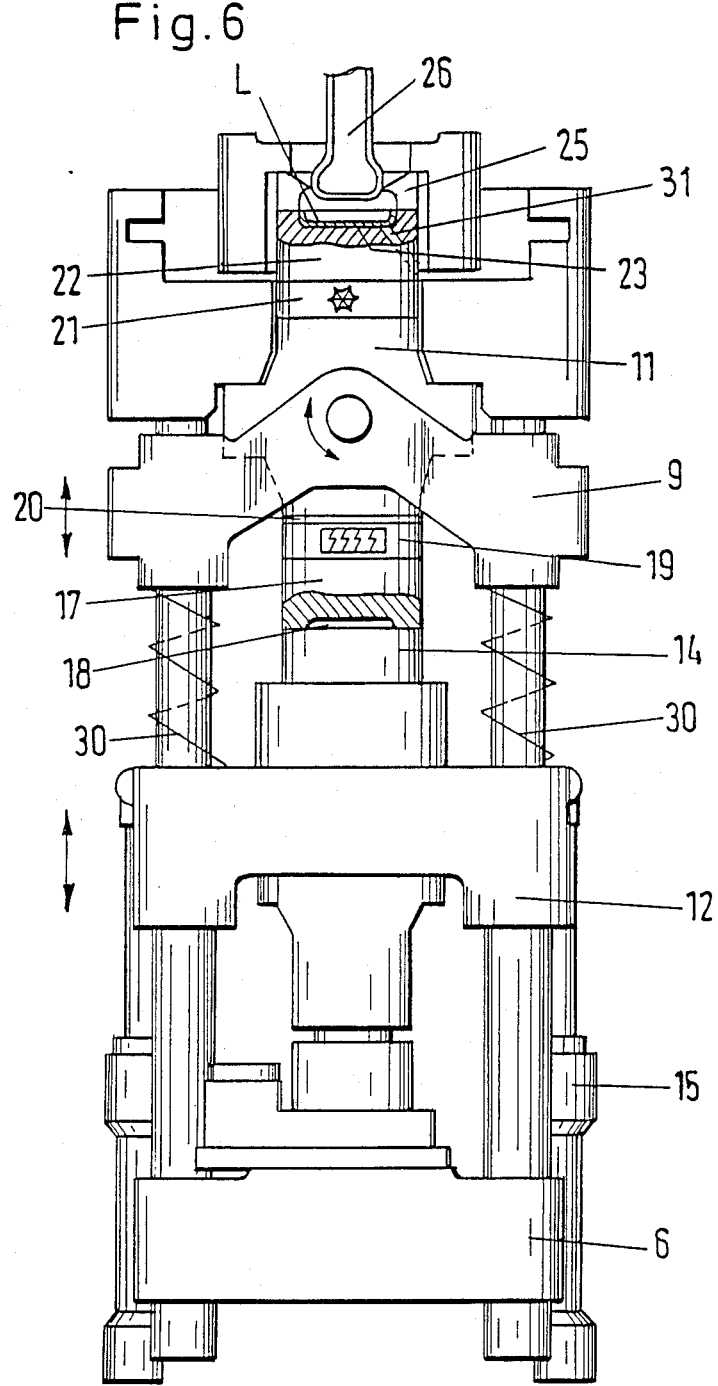

The molding apparatus shown in its FIG. 6 position is located at station $2_{14}$.

From the above description it can be clearly seen that in the stationary position of the circular turntable an outer sole and an inner sole are respectively injected at the same time and, simultaneously, in the area between stations $2_{04}$ or $2_{14}$ a finished shoe having a molded outer sole of elastomer and a molded inner sole of polyurethane is removed at a discharge station (not shown).

A circular turntable has been described as rotatable through short increments, although it is within the scope of the invention to also provide individual mold stations located on a turntable. In such arrangement, the device 4 for mixing of the mixture reacting into the polyurethane and the device 3 for the plastification and injection aggregate for the, elastomer would be arranged above one another.

The mold apparatus according to the invention can employ different mold parts for the vulcanization of the injected outer sole of elastomer and for the cooling of the vulcanized outer sole, so that the times for the vulcanization and the cooling can be set independent of each other.

Moreover, it is essential that the total time for the vulcanization and cooling of the outer soles until further processing is considerably shorter than with the use of mold parts which must be heated for vulcanization and then cooled for the cooling of the outer sole.

What is claimed is:

1. A process for molding outer and inner soles on to shoe uppers, comprising the steps of forming a molded outer sole by injecting molding an elastomer into a mold cavity defined by a heatable first mold part at one end of a pivotable and axially movable mold carrier and an axially movable confronting mold plate, the injection molding being carried out while pressing said carrier against a stationary support by moving said mold plate into a mold closing position against said mold part, releasing the molded outer sole on to said mold plate by shifting said carrier away from said support and separating said mold part into a mold opening position, pivoting said mold carrier such that a cooled second mold part at an opposite end thereof overlies the molded outer sole, transferring the molded outer sole to said second mold part, pivoting said mold carrier to confront the molded outer sole to a last supported shoe upper located adjacent said support, forming an inner sole mold cavity with the molded outer sole by disposing said last supported shoe upper adjacent the molded outer sole and by closing an opposed pair of lateral mold elements about the shoe upper, forming a molded inner sole by injection molding a mixture of isocyanate and a polyol reacting into polyurethane into said inner sole mold cavity, and thereby bonding the molded inner sole to the shoe upper, the elastomer containing additives of reactive end groups of substances to effect chemical bonding with the isocyanate.

2. The process according to claim 1, wherein the transferring of the molded outer sole is effected by suctioning the molded outer sole to said second mold part.

3. The process according to claim 1, wherein the injection molding of the inner sole is carried out while again pressing said carrier against said support by moving said mold plate into said mold closing position permitting simultaneous injection molding of the inner sole and injection molding of another outer sole.

* * * * *